United States Patent [19]

King et al.

[11] Patent Number: 5,343,895

[45] Date of Patent: Sep. 6, 1994

[54] HEAT RESISTIVE SLEEVE ASSEMBLY

[76] Inventors: Michael G. King, 147 E. Avenue, Napoleon, Mich. 49261; Michael R. Jusick, 151 Bennett Dr., Michigan Center, Mich. 59254

[21] Appl. No.: 73,161

[22] Filed: Jun. 7, 1993

[51] Int. Cl.$^5$ .......................... F16L 9/14; F16L 11/24
[52] U.S. Cl. ..................... 138/149; 138/125; 138/126
[58] Field of Search ..................... 87/1, 6, 8, 9; 138/124–127, 149, DIG. 2, DIG. 3; 139/387 R, 388

[56] References Cited

U.S. PATENT DOCUMENTS

| | | | |
|---|---|---|---|
| 682,444 | 9/1901 | Woodward | 138/126 |
| 1,104,778 | 7/1914 | Cobb | 138/126 |
| 3,007,497 | 11/1961 | Shobert | 138/125 |
| 3,117,597 | 1/1964 | Fritz et al. | 138/125 |
| 4,275,937 | 6/1981 | Belofsky | 138/127 |
| 4,488,577 | 12/1984 | Shilad | 138/127 |
| 5,142,782 | 9/1992 | Martucci | 29/890.144 |

FOREIGN PATENT DOCUMENTS 633976 12/1949 United Kingdom ................ 138/127

*Primary Examiner*—Timothy F. Simone
*Assistant Examiner*—Terrence R. Till
*Attorney, Agent, or Firm*—Reising, Ethington, Barnard, Perry & Milton

[57] ABSTRACT

A heat resistive sleeve (10) is capable of surrounding conduits, hoses and the like. The heat resistive sleeve (10) includes one outer layer (20) and, if necessary, a plurality of inner layers (12, 30, 38), all of which are fabricated of interwoven fiberglass yarns. To increase the insulating properties of the fiberglass, fibers of a second outer fiberglass yarn (24) are braided together to form a solid braid (26) having a radial thickness (T2) greater than the radial thickness (T1) of a first outer fiberglass yarn (22). A second inner layer (30) includes a first untextured fiberglass yarn (32) interwoven with a third textured fiberglass yarn (34), the textured fiberglass yarn (34) being less dense and having a radial thickness (T3) greater than the radial thickness (T1) of the untextured fiberglass yarn creating additional spaces (36) which further increase the thermal insulation of the heat resistive sleeve (10). A mandrel (48) is used to form the heat resistive sleeve (10) and may or may not be included in the heat resistive sleeve (10) when used.

8 Claims, 2 Drawing Sheets

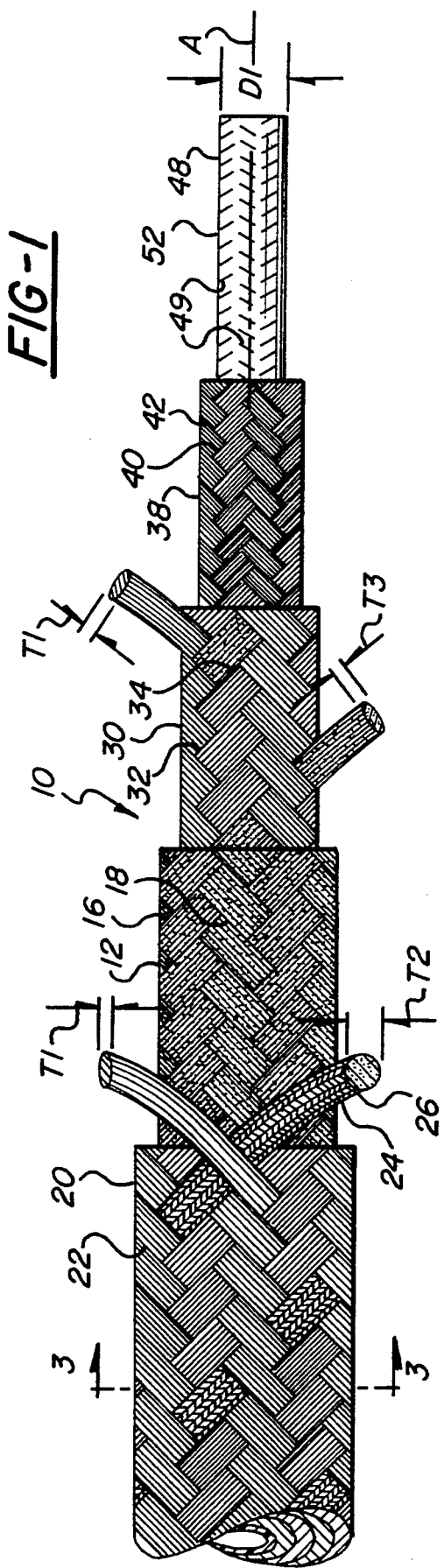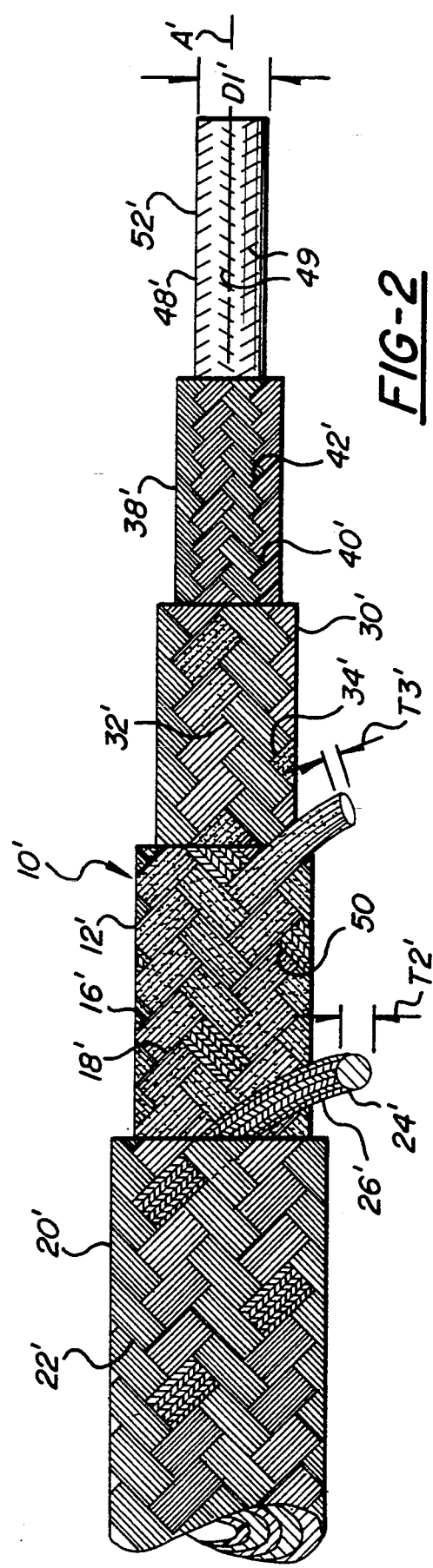

HEAT RESISTIVE SLEEVE ASSEMBLY

BACKGROUND ART

1. Technical Field

The subject invention relates to a protective sleeve assembly. More particularly, the subject invention relates to a protective sleeve assembly for thermally insulating its interior.

2. Description of Related Art

Components used in engine compartments are exposed to more extreme heats due to the more efficient engines running at higher revolutions in combination with the close proximity of all the components in the engine compartment due to the downsizing of vehicles.

U.S. Pat. No. 5,142,782, issued to Martucci on Sep. 1, 1992 and assigned to the assignee of the subject invention, discloses a hose assembly having an inner liner surrounded by a non-metallic interwoven fiber which is subsequently coated with a fluorocarbon polymer. The hose assembly effectively resists wear due to friction created between the hose assembly and components found exteriorly thereof. However, this hose assembly is not capable of insulating its interior from extreme heat conditions found near certain components such as the exhaust manifold.

U.S. Pat. No. 3,117,597, issued to Fritz et al., on Jan. 14, 1964, discloses a jet engine starter fuel hose having an inner lining fabricated from a silicone elastomer surrounded by two layers of helically wound glass fibers. These layers are covered by an uncured elastomeric layer which is, in turn, covered by a reinforcing layer. This hose assembly is designed to have a 290° F. temperature differential between the hose interior and exterior with an exterior temperature of 615° F. This temperature differential is inadequate in current engine compartment designs where temperatures approach the range of 1,000° F., at which temperatures it is not apparent this jet fuel hose assembly can operate. Regardless of whether the materials fabricating the jet fuel hose assembly can withstand such high temperatures, a 290° F. temperature differential at a 1,000° F. is insufficient protection for most components and fluids in the interior of a thermally protective sleeve assembly.

SUMMARY OF THE INVENTION AND ADVANTAGES

A heat resistive sleeve assembly is disclosed comprising a first sleeve having a hollow interior and defining a longitudinal axis. The first sleeve is fabricated from first and second outer sets of non-metallic fibers interwoven together. The first set of non-metallic fibers have a first radial thickness and the second set of non-metallic fibers have a second radial thickness. The second radial thickness is greater than the first radial thickness. The heat resistive sleeve assembly is characterized by the second set of non-metallic fibers being braided together into a first solid braid. The first solid braid prevents the second radial thickness from decreasing during usage of the first sleeve to maintain the thermal insulation between the hollow interior and the outside of the heat resistive sleeve assembly.

The advantages associated with the subject invention include an increased thermal differential between the exterior of the sleeve assembly and the interior thereof to at least 700° F. allowing engine components and controls typically restricted in their placement within the engine compartment to be placed in areas within the engine compartment reaching 1,400° F. In addition, the solid cylindrical braid increases the wear resistance of the sleeve because an increased amount of friction is required to wear through a braid as opposed to a group glass fibers twisted together.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a partial side view of the preferred embodiment of the subject invention with each layer partially removed to show the layer below;

FIG. 2 is a partial side view of an alternative embodiment of the subject invention with each layer partially removed to show the layer below;

DETAILED DESCRIPTION OF THE DRAWINGS

Figure 4:
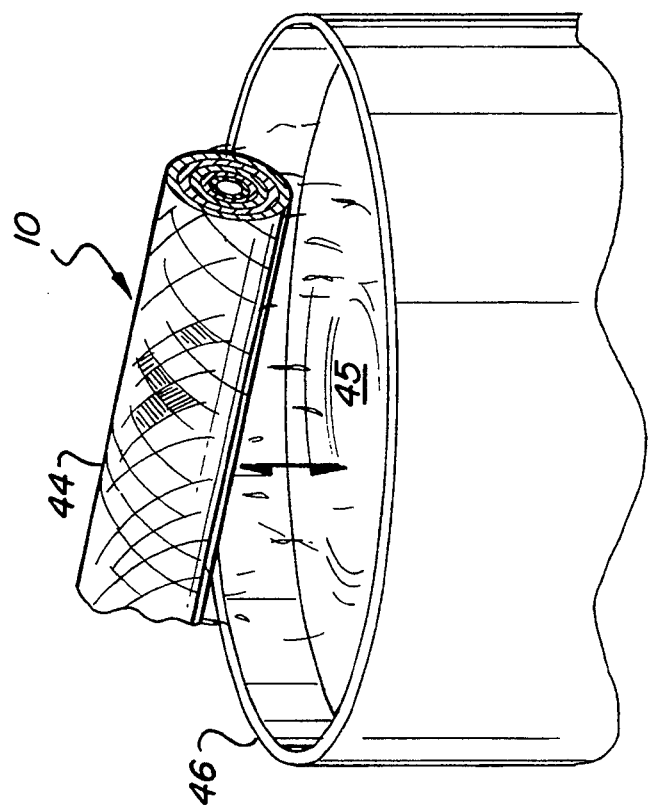
FIG. 4 is a perspective view partially cut away of the preferred embodiment of the subject invention and a coating bath.
Figure 3:
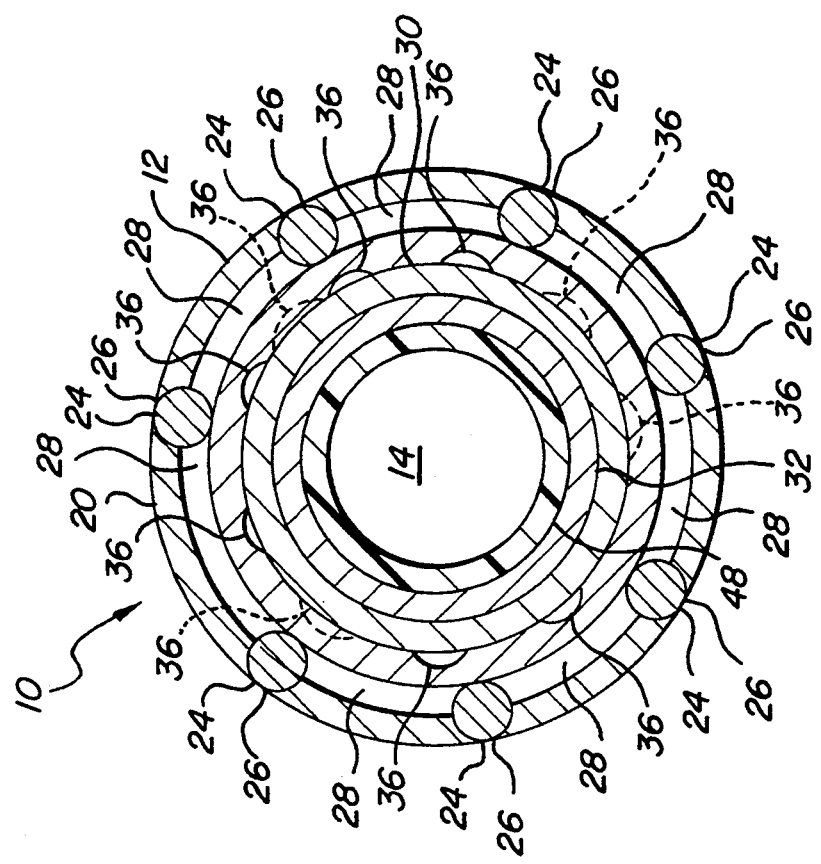
FIG. 3 is a cross-sectional view of the preferred embodiment of the subject invention taken along line 3—3 in FIG. 1.

With reference to the Figures, the subject invention is a heat resistive sleeve assembly or sheath assembly and is generally indicated at 10. The heat resistive sleeve assembly 10 includes a second sleeve 12 having a hollow interior 14. It may be appreciated by those skilled in the art that the heat resistive sleeve assembly 10 can include a circular, rectangular or any cross-sectional periphery. In the preferred embodiment, however the subject invention 10 is shown and described with a cylindrical cross section. The second sleeve 12 is fabricated from first 16 and second 18 inner sets of non-metallic fibers interwoven together to increase thermal insulation. Although the first 16 and second 18 inner sets of fibers can be fabricated from any non-metallic substance suitable for high temperature environments, the preferred embodiment of the subject invention 10 uses sets of glass fibers such as Fiberglas ®. The fiberglass yarns 16, 18 are textured giving them a fuzzy appearance. This texturing of the fiberglass, created by blowing air on the fibers as they are processed into a yarn, reduces the density of the yarn which is interwoven to create the second sleeve 12. Because this yarn is less dense, more air is interspersed within the yarn adding to the thermal insulation properties of the first inner cylindrical sleeve 12. Said another way, the denier of the fiberglass yarns 16, 18 is approximately equal to the denier of the untextured fiberglass yarns (discussed subsequently) and, therefore, the radial thickness of the textured fiberglass yarns is greater than that of the untextured fiberglass yarns.

The heat resistive sleeve assembly 10 further includes a first sleeve 20 which, in the preferred embodiment, encompasses, surrounds, or extends around the periphery of the second sleeve 12 and shares the same hollow interior 14. It is not, however, beyond the scope of the subject invention to surround the first sleeve 20 with the second sleeve 12. The first sleeve 20 is fabricated from a first outer fiberglass yarn 22 interwoven with a second outer fiberglass yarn 24 wherein the first outer fiberglass yarn 22 is twisted together and define a first radial thickness T1, as best seen in FIG. 1 wherein the radial thickness T1 of the first outer fiberglass yarn 22 equals the cross-sectional area of the first inner untextured fiberglass yarn 32, 32' discussed subsequently.

The heat resistive sleeve assembly 10 is characterized by the second outer fiberglass yarn 24 being braided together into a solid braid 26 for preventing the second radial thickness T2 from decreasing during usage of the first sleeve 20. The maintenance of the second radial thickness T2 insures air gaps or spaces 28 (discussed subsequently) which increase the thermal insulation between the hollow interior and the outside of the heat resistive sleeve assembly.

Although the terms 'braid' and 'interweave' are generally interchangeable terms, for purposes of clarity, the term 'braid' will be used when discussing the physical properties of the cylindrical braids 26, 50 whereas 'interweave' will be used when discussing the physical properties of the layers of the heat resistive sleeve assembly 10.

The heat resistive sleeve assembly 10 further includes a third sleeve 30 located within the first inner cylindrical sleeve 12. The third sleeve 30 is fabricated from a first inner untextured fiberglass yarn 32 having an untextured radial thickness (equal to the radial thickness T1) interwoven with a third inner textured fiberglass yarn 34 having a textured radial thickness T3 greater than the untextured radial thickness. The difference in thickness between the textured fiberglass yarn 34 and the untextured fiberglass yarn 32 forms a second plurality of spaces 36 between the third sleeve 30 and the second sleeve 12 to increase the thermal insulation between the hollow interior 14 and the outside of the heat resistive sleeve assembly 10. This thermal insulation is further increased by the air gaps between the glass fibers found within the textured fiberglass yarns.

The assembly further includes a fourth sleeve 38 being fabricated from a second inner untextured fiberglass yarn 40 interwoven with a third inner untextured fiberglass yarn 42 to increase the thermal insulation between the hollow interior 14 and the outside of the heat resistive sleeve assembly 10.

A coating 44 encompasses and impregnates the outer cylindrical sleeve 20 and prevents the fraying of the fiberglass yarns used on the outermost layer, the first sleeve 20 in the preferred embodiment, after the heat resistive sleeve assembly 10 has been cut. In addition to the coating 44 being used to maintain the integrity of the first 22 and second 24 outer fiberglass yarns, it may also be used to reflect thermal radiation. The coating 44 is fabricated from a fluoroplastic elastomer and, in the preferred embodiment, the coating 44 is made from polytetrafluoroethylene, "PTFE", sold under the trademark Teflon ®. As an alternative, a silicone-based coating could be used in lieu of Teflon ®. To enhance the thermal reflective properties of the coating 44, metal particles, i.e., aluminum particles, may be added.

The heat resistive sleeve assembly 10 is dipped into a container 46 containing the Teflon ® after all of the sleeves 12, 20, 30, 38 have been manufactured. The heat resistive sleeve assembly 10 is dipped in the Teflon ® bath 45 for a period of time to allow the outer most sleeve, the first sleeve 20 in the preferred embodiment, to absorb the Teflon ® 44. The Teflon ® coating 44 is prevented from being absorbed by anything other than the outermost sleeve (20) as such an absorption would be cost prohibitive.

Mandrel means 48 having an outer diameter D1 guides the second 40 and third 42 inner untextured fiberglass yarns to create the third inner cylindrical sleeve 30 so as to create the fourth sleeve 38 having an inner diameter being equal or consistent throughout the length of the heat resistive sleeve assembly 10. The mandrel means 48 comprises of a hollow mandrel fabricated from an organic polymeric material suitable to withstand the manufacturing processes associated with creating the heat resistive sleeve assembly 10. The mandrel 48 may have a smooth outer surface or, as is shown in the Figures, the outer surface 52 of the mandrel 48 can be textured with the ridges 49 to help guide the second 40 and third 42 inner untextured fiberglass yarns as they are being interwoven over the mandrel 48 and help prevent slippage therebetween.

It should be understood that the mandrel 48 may be removed once the heat resistive sleeve assembly 10 has been manufactured. Therefore, depending upon the use in which the heat resistive sleeve assembly 10 is to be used, the mandrel 48 may remain in place or, in the alternative, the mandrel 48 may be removed.

In an alternative embodiment, as shown in FIG. 2 wherein like prime numerals represent similar structure, the heat resistive sleeve assembly 10' includes a second sleeve 12' being fabricated from a first inner textured fiberglass yarn 16' textured to increase the thermal resistivity which is interwoven with a second inner fiberglass yarn 18'. In this embodiment, however, the second inner fiberglass yarn 18' is braided to form a second solid braid 50. This second solid braid 50 is interwoven with the first inner fiberglass yarn 16' in a direction opposite that of the first solid braid 26 of the first sleeve 20 to increase the thermal insulation of the heat resistive sleeve assembly 10'. It is necessary for the second solid braid 50 to be interwoven with the first inner set of fiberglass thread 16' in a direction opposite that of the first solid braid 26 to increase the spaces between the first sleeve 20' and the second sleeve 12'. If the second solid braid 50 was interwoven into the second sleeve 12' in the same direction as that of the first solid braid 26, the spaces created by the first solid braid 26 would be filled by the second solid braid 50, thus eliminating all of the advantages to having the first solid braid 26 incorporated within the heat resistive sleeve assembly 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A heat resistive sleeve assembly (10) comprising:
   a first sleeve (20) having a hollow interior (14) and defining a longitudinal axis (A) being fabricated from first (22) and second (24) sets of non-metallic fibers interwoven together, said first set of non-metallic fibers (22) having a first radial thickness (T1) and said second set of non-metallic fibers (24) having a second radial thickness (T2), said second radial thickness (T2) being greater than said first radial thickness (T1), said heat resistive sleeve assembly (10) characterized by said second set of non-metallic fibers (22) being braided together into a first solid braid (26) for preventing said second radial thickness (T2) from decreasing during usage of said first sleeve (20) to maintain thermal insulation between said hollow interior (14) and the outside of said heat resistive sleeve assembly (10).

2. An assembly (10) as set forth in claim 1 further characterized by a second sleeve (12) being fabricated from first (16) and second (18) inner sets of textured non-metallic fibers interwoven together along said longitudinal axis (A) located within and abutting said first sleeve (20) defining a plurality of first spaces (28) between said first (20) and second (12) sleeves for increasing thermal insulation between said hollow interior (14) and the outside of said heat resistive sleeve assembly (10).

3. An assembly (10′) as set forth in claim 2 further characterized by said second sleeve (12′) being fabricated from first (16′) and second (18′) inner sets of non-metallic fibers interwoven together, said second inner set of non-metallic fibers (18′) forming an inner solid braid (50) interwoven with said first inner set of non-metallic fibers (16′) to increase the volume of said spaces (28) to increase thermal insulation.

4. An assembly (10, 10′) as set forth in either claim 2 or claim 3 further characterized by a third sleeve (30) within said second sleeve (12) being fabricated from a first inner set of untextured radial thickness (T1) and a third set of textured non-metallic fibers (34) having a textured radial thickness (T3) greater than said untextured radial thickness (T1) interwoven together along said longitudinal axis (A) forming a plurality of second spaces (36) between said third sleeve (30) and said second sleeve (12), said plurality of second spaces (36) increasing the thermal insulation between said hollow interior (14) and the outside of said heat resistive sleeve assembly (10).

5. An assembly (10, 10′) as set forth in claim 4 further characterized by a fourth sleeve (38) being fabricated from second (40) and third (42) inner sets of untextured non-metallic fibers interwoven together along said longitudinal axis (A) to increase the thermal insulation between said hollow interior (14) and the outside of said heat resistive sleeve assembly (10).

6. An assembly (10, 10′) as set forth in claim 5 further characterized by a coating (44) encompassing and impregnating said sleeve (20) for preventing the fraying of said first (22) and second (24) outer sets of non-metallic fibers after said heat resistive sleeve assembly (10) has been cut.

7. An assembly as set forth in claim 6 further characterized by said non-metallic fibers being fabricated from glass fibers.

8. An assembly (10, 10′) as set forth claim 7 further characterized by mandrel means (48) having an outer diameter (D1) for guiding said second (40) and said third (42) inner sets of untextured non-metallic fibers to create said fourth sleeve (38) with said inner diameter being of equal length throughout the length of said heat resistive sleeve assembly (10).

* * * * *